United States Patent
Kato et al.

(10) Patent No.: US 12,403,902 B2
(45) Date of Patent: Sep. 2, 2025

(54) CONTROL DEVICE, CONTROL METHOD, AND STORAGE MEDIUM

(71) Applicant: HONDA MOTOR CO., LTD., Tokyo (JP)

(72) Inventors: Daichi Kato, Wako (JP); Tomotaka Teramachi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 233 days.

(21) Appl. No.: 18/121,604

(22) Filed: Mar. 15, 2023

(65) Prior Publication Data

US 2023/0311869 A1 Oct. 5, 2023

(30) Foreign Application Priority Data

Mar. 31, 2022 (JP) ................. 2022-059757

(51) Int. Cl.
*B60W 30/12* (2020.01)
*B60Q 1/34* (2006.01)
(Continued)

(52) U.S. Cl.
CPC .............. *B60W 30/12* (2013.01); *B60Q 1/34* (2013.01); *B60Q 1/343* (2013.01); *B60W 10/20* (2013.01);
(Continued)

(58) Field of Classification Search
CPC ...... B60W 30/12; B60W 10/20; B60W 10/30; B60W 30/18163; B60W 10/18;
(Continued)

(56) References Cited

U.S. PATENT DOCUMENTS

| 11,654,962 B2 * | 5/2023 | Saito ................... G06V 20/588 701/41 |
| 2005/0155808 A1 * | 7/2005 | Braeuchle .......... B62D 15/0255 180/402 |

(Continued)

FOREIGN PATENT DOCUMENTS

| JP | 2017-146817 | 8/2017 |
| JP | 2020-163927 | 10/2020 |

(Continued)

OTHER PUBLICATIONS

Japanese Office Action for Japanese Patent Application No. 2022-059757 mailed Jun. 11, 2024.
(Continued)

*Primary Examiner* — Phutthiwat Wongwian
*Assistant Examiner* — Brian R Kirby
(74) *Attorney, Agent, or Firm* — Amin, Turocy & Watson, LLP

(57) ABSTRACT

A control device controls at least steering of a host vehicle to execute branch control, the branch control including lane keeping control for causing the host vehicle to travel so that the host vehicle does not deviate from a first lane in which the host vehicle travels, and lane change control for causing the host vehicle to change lanes to a second lane branching from the first lane, and stops the lane keeping control and the lane change control when an event in which the branch control is not executable occurs after starting the lane change of the host vehicle from the first lane to the second lane on the basis of the lane change control, in a case in which the host vehicle plans on traveling from the first lane to the second lane through execution of the lane keeping control and the lane change control.

13 Claims, 10 Drawing Sheets

(51) Int. Cl.
*B60W 10/18* (2012.01)
*B60W 10/20* (2006.01)
*B60W 10/30* (2006.01)
*B60W 30/18* (2012.01)

(52) U.S. Cl.
CPC ...... *B60W 10/30* (2013.01); *B60W 30/18163* (2013.01); *B60W 10/18* (2013.01)

(58) Field of Classification Search
CPC ......... B60W 2554/406; B60W 60/001; B60W 40/09; B60W 30/18; B60W 2540/215; B60Q 1/34; B60Q 1/343; B60Q 1/346; B60Q 1/40; B60R 16/023
USPC .............................................. 701/23, 41, 96
See application file for complete search history.

(56) References Cited

U.S. PATENT DOCUMENTS

| | | | |
|---|---|---|---|
| 2008/0183342 A1* | 7/2008 | Kaufmann | B60W 60/0061 701/1 |
| 2016/0091896 A1* | 3/2016 | Maruyama | B60W 30/18163 701/23 |
| 2017/0018189 A1* | 1/2017 | Ishikawa | G05D 1/0088 |
| 2017/0061799 A1* | 3/2017 | Fujii | G08G 1/167 |
| 2017/0225685 A1* | 8/2017 | Aoki | B60Q 1/346 |
| 2017/0240172 A1 | 8/2017 | Nishiguchi et al. | |
| 2018/0037223 A1* | 2/2018 | Goto | G05D 1/0231 |
| 2018/0345967 A1* | 12/2018 | Oniwa | B60K 28/02 |
| 2019/0047469 A1* | 2/2019 | Nishiguchi | B60Q 1/40 |
| 2019/0071099 A1* | 3/2019 | Nishiguchi | B62D 15/0255 |
| 2019/0135290 A1* | 5/2019 | Marden | G06V 20/588 |
| 2019/0143983 A1* | 5/2019 | Hashimoto | G05D 1/0088 701/23 |
| 2019/0315362 A1* | 10/2019 | Um | B60W 50/10 |
| 2019/0354108 A1 | 11/2019 | Okajima et al. | |
| 2020/0307596 A1 | 10/2020 | Yashiro | |
| 2021/0101600 A1* | 4/2021 | Kato | B60Q 1/40 |
| 2021/0179115 A1 | 6/2021 | Satti et al. | |
| 2022/0105942 A1* | 4/2022 | Aso | B60W 30/12 |
| 2022/0212717 A1 | 7/2022 | Saito | |
| 2022/0234607 A1* | 7/2022 | Hata | B60W 60/001 |

FOREIGN PATENT DOCUMENTS

| | | |
|---|---|---|
| JP | 2020-189543 | 11/2020 |
| JP | 2021-170364 | 10/2021 |
| WO | 2018/138765 | 8/2018 |
| WO | 2020/230301 | 11/2020 |

OTHER PUBLICATIONS

Japanese Office Action for Japanese Patent Application No. 2022-059757 mailed Feb. 6, 2024.

* cited by examiner

| SPECIFIC EVENT HAS OCCURRED BEFORE STEERING ASSISTANCE | ACCELERATION IS SUPPRESSED AND LANE KEEPING CONTROL IS EXECUTED IN TRAVELING LANE(LANE BEFORE LANE CHANGE) |
|---|---|
| SPECIFIC EVENT HAS OCCURRED AFTER STEERING ASSISTANCE | ACCELERATION IS SUPPRESSED AND LANE KEEPING CONTROL IS SUSPENDED |

CONTROL DEVICE, CONTROL METHOD, AND STORAGE MEDIUM

CROSS-REFERENCE TO RELATED APPLICATION

Priority is claimed on Japanese Patent Application No. 2022-059757, filed Mar. 31, 2022, the content of which is incorporated herein by reference.

BACKGROUND

Field of the Invention

The present invention relates to a control device, a control method, and storage medium.

Description of Related Art

In recent years, efforts to provide a sustainable transportation system that takes various situations into account have become active. In order to realize this, research and development are focused on further improving the safety or convenience of traffic through research and development regarding driving assistance technology. For example, a travel control device that performs control for causing a vehicle to transition to manual driving in a case in which a vehicle cannot return to an original lane and a driver can take over steering when automatic lane change is suspended and causing the vehicle to evacuate to a road shoulder or the like and stop in a case in which the vehicle cannot return to the original lane and the driver does not take over the steering has been disclosed (Japanese Unexamined Patent Application, First Publication No. 2020-189543).

SUMMARY

Control applied in the related art may not be suitable for the driver.

The present invention has been made in consideration of such circumstances, and one object thereof is to provide a control device, a control method, and a storage medium capable of realizing more suitable control for a driver. Further, the present invention contributes to the development of sustainable transportation systems.

A control device, a control method, and a storage medium according to the present invention adopt the following configurations.

(1): A control device mounted on a mobile object according to an aspect of the present invention includes a storage medium configured to store computer-readable instructions; and one or more processors connected to the storage medium, wherein the one or more processors execute the computer-readable instructions to: recognize a situation of surroundings of a host vehicle, automatically control at least steering of the host vehicle to execute branch control on the basis of the recognized surroundings situation, the branch control including lane keeping control for causing the host vehicle to travel so that the host vehicle does not deviate from a first lane in which the host vehicle is traveling, and lane change control for causing the host vehicle to change lanes to a second lane branching from the first lane, and stop the lane keeping control and the lane change control when an event in which the branch control is not executable occurs after starting the lane change of the host vehicle from the first lane to the second lane on the basis of the lane change control, in a case in which the host vehicle plans on traveling from the first lane to the second lane through execution of the lane keeping control and the lane change control.

(2): In the aspect (1), the one or more processors execute the computer-readable instructions to: turn on a direction indicator of the host vehicle without depending on an operation of a driver and start the lane change control before the host vehicle reaches a start position of the lane change, and "after starting the lane change" means "after turning on the direction indicator".

(3): In the aspect (1) or (2), the event is at least one of the following (1), (2) and (3): (1) the one or more processors are unable to recognize a position of the host vehicle, (2) the one or more processors are unable to recognize the second lane or a situation of the second lane on the basis of a result of the recognition, and (3) a degree of congestion in or near the second lane is equal to or higher than a threshold.

(4): In any one of the aspects (1) to (3), in the case in which the host vehicle plans on traveling from the first lane to the second lane through execution of the lane keeping control and the lane change control, the one or more processors execute the computer-readable instructions to: execute the lane keeping control to cause the host vehicle to travel so that the host vehicle does not deviate from the first lane, until the host vehicle reaches a start position of the lane change, start the lane change control to cause the host vehicle to change lanes from the first lane to the second lane when the host vehicle reaches the start position, and stop the lane change control and execute the lane keeping control to cause the host vehicle to travel so that the host vehicle does not deviate from the second lane, after the lane change.

(5): In the aspect (4), the one or more processors execute the computer-readable instructions to: cause the host vehicle to start the lane change, and then, stop the lane keeping control and the lane change control when an event in which the branch control cannot be executed occurs, and resume the lane keeping control when a preset condition is satisfied.

(6): In the aspect (5), the preset condition is at least one of the following (A), (B) and (C): (A) the host vehicle has reached a set position, (B) the host vehicle has traveled a predetermined distance in the second lane, and (C) the host vehicle has traveled for a predetermined time in the second lane.

(7): In the aspect (6), the one or more processors execute the computer-readable instructions to: resume the lane keeping control when the condition (A) is not satisfied and the condition (B) or (C) is satisfied.

(8): In any one of the aspects (1) to (7), the one or more processors execute the computer-readable instructions to: stop the lane keeping control and the lane change control when an event in which the one or more processors cannot execute the branch control occurs, and control a speed of the host vehicle so that the speed of the host vehicle at the time of occurrence of the event is maintained.

(9): In any one of the aspects (1) to (8), the lane keeping control is executable in a state in which the driver of the host vehicle is not gripping a steering wheel of the host vehicle, and the lane change control is executable on the condition that the driver is gripping the steering wheel.

(10): In the aspect (9), the one or more processors execute the computer-readable instructions to: control the host vehicle so that the host vehicle does not deviate from the first lane based on the lane keeping control in a case in which the driver is not gripping the steering wheel when the host vehicle reaches a start position of the lane change.

(11): In any one of the aspects (1) to (10), the one or more processors execute the computer-readable instructions to: decelerate the host vehicle in order to change the lane from the first lane to the second lane when the host vehicle reaches a predetermined distance before a start position at which the host vehicle starts changing lanes, and control a speed of the host vehicle so that the speed of the host vehicle at the time of occurrence of the event is maintained and control the host vehicle so that the host vehicle does not deviate from the first lane when the event occurs after the deceleration and before start of the lane change control.

(12): A control method according to another aspect of the present invention, wherein a control device executes: recognizing a situation of surroundings of a host vehicle; automatically controlling at least steering of the host vehicle to perform branch control on the basis of the recognized surroundings situation, the branch control including lane keeping control for causing the host vehicle to travel so that the host vehicle does not deviate from a first lane in which the host vehicle travels, and lane change control for causing the host vehicle to change lanes to a second lane branching from the first lane, and stopping the lane keeping control and the lane change control when an event in which the branch control is not executable occurs after starting the lane change of the host vehicle from the first lane to the second lane on the basis of the lane change control, in a case in which the host vehicle plans on traveling from the first lane to the second lane through execution of the lane keeping control and the lane change control.

(13): A storage medium having a program stored therein according to another aspect of the present invention, the program causing a control device to execute: recognizing a situation of surroundings of a host vehicle; automatically controlling at least steering of the host vehicle to perform branch control on the basis of the recognized surroundings situation, the branch control including lane keeping control for causing the host vehicle to travel so that the host vehicle does not deviate from a first lane in which the host vehicle travels, and lane change control for causing the host vehicle to change lanes to a second lane branching from the first lane, and stopping the lane keeping control and the lane change control when an event in which the branch control is not executable occurs after starting the lane change of the host vehicle from the first lane to the second lane on the basis of the lane change control, in a case in which the host vehicle plans on traveling from the first lane to the second lane through execution of the lane keeping control and the lane change control.

According to aspects (1) to (13), it is possible to realize more suitable control for a driver. For example, the lane keeping control and the lane change control are stopped, making it possible for a driver to control the host vehicle and cause the host vehicle to travel in the branch lane without feeling uncomfortable. For example, it is possible for control to be taken over to the driver without hindering operation of the driver.

According to the aspect (2), since the driver does not need to operate the direction indicator, convenience for a user is improved.

According to the aspect (4), when no event occurs, the host vehicle can smoothly enter the branch lane without depending on an operation of the driver and realize stable traveling after entering.

According to the aspect (5) or (6), when a preset condition is satisfied, the lane keeping control is resumed, and thus, convenience for a user is improved.

According to the aspect (7), since the lane keeping control is resumed, stable traveling is realized in the branch lane.

According to the aspect (8), since a speed at which the event has occurred is maintained, it is possible to suppress an operation of the driver being hindered.

According to the aspect (11), it is possible to stabilize traveling of the host vehicle even when an event has occurred.

DESCRIPTION OF EMBODIMENTS

[Overall Configuration]

Figure 1:
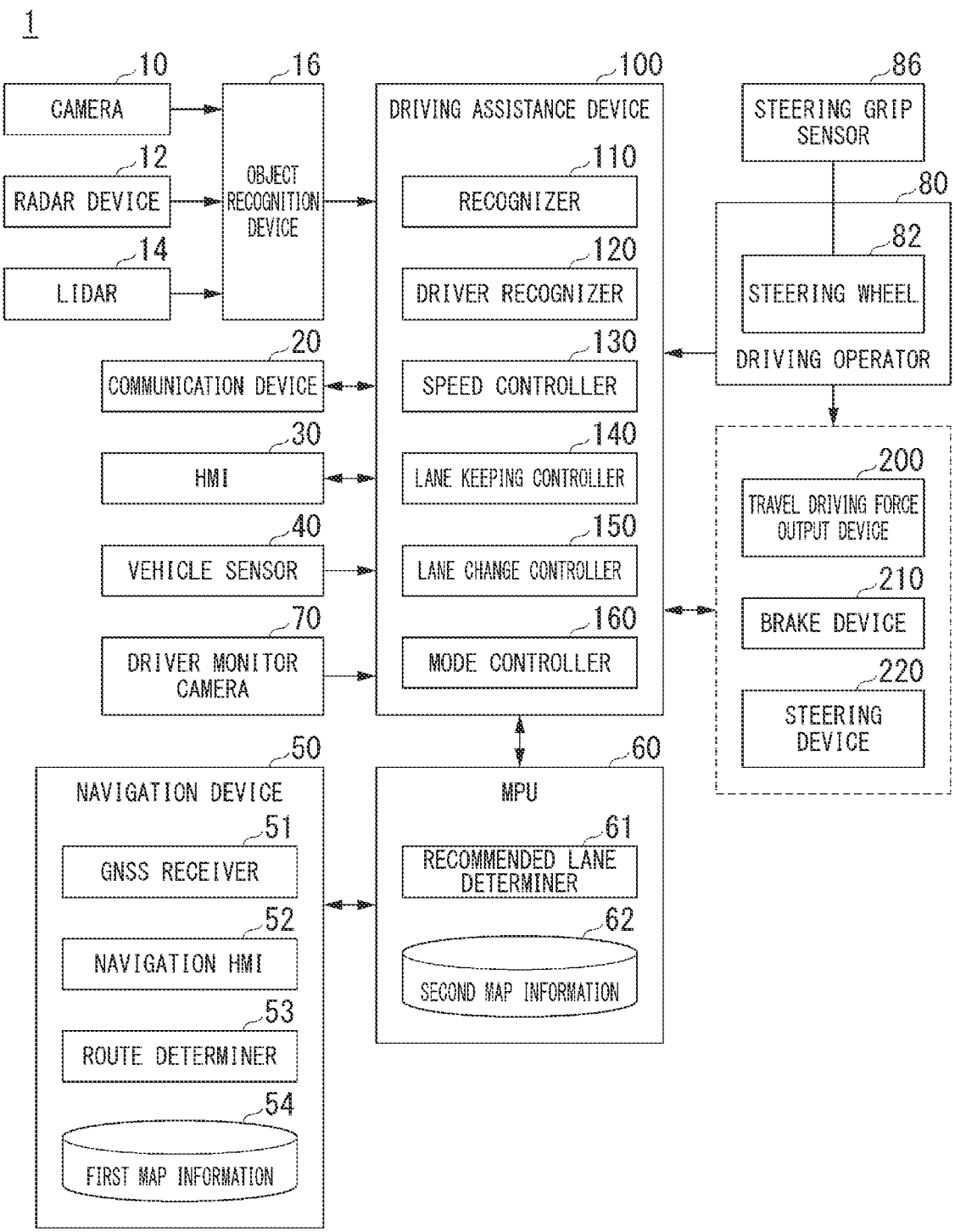
FIG. 1 is a configuration diagram of a vehicle system using a vehicle control system according to an embodiment.

FIG. 1 is a configuration diagram of a vehicle system 1 using a vehicle control system according to an embodiment. A vehicle on which the vehicle system 1 is mounted is, for example, a vehicle such as a two-wheeled vehicle, a three-wheeled vehicle, or a four-wheeled vehicle, and a driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, an MPU 60, a driver monitor camera 70, a driving operator 80, a driving assistance device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration shown in FIG. 1 is merely an example, and a part of the configuration may be omitted or other configurations may be added thereto. The driving assistance device 100 is an example of a "control device".

The camera 10 is, for example, a digital camera using a solid-state imaging device such as a charge coupled device (CCD) or a complementary metal oxide semiconductor (CMOS). The camera 10 is attached to any location on a vehicle on which the vehicle system 1 is mounted (hereinafter referred to as a host vehicle M). When a forward side is imaged, the camera 10 is attached to, for example, an upper portion of a front windshield, a rear surface of a rearview mirror, or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by an object to detect at least a position (a distance and orientation) of the object. The radar device 12 is attached to any location on the host vehicle M. The radar device 12 may detect a position and a speed of the object using a frequency modulated continuous wave (FM-CW) scheme.

The LIDAR 14 irradiates the surroundings of the host vehicle M with light (or an electromagnetic wave having a wavelength close to that of light) and measures scattered light. The LIDAR 14 detects a distance to a target on the basis of a time from light emission to light reception. The light to be radiated is, for example, pulsed laser light. The LIDAR 14 is attached to any location on the host vehicle M.

The object recognition device 16 performs sensor fusion processing on detection results of some or all of the camera 10, the radar device 12, and the LIDAR 14 to recognize a position, type, speed, and the like of the object. The object recognition device 16 outputs recognition results to the driving assistance device 100. The object recognition device 16 may output detection results of the camera 10, the radar device 12, and the LIDAR 14 as they are to the driving assistance device 100. The object recognition device 16 may be omitted from the vehicle system 1.

The communication device 20, for example, communicates with another vehicle present around the host vehicle M using a cellular network, a Wi-Fi network, Bluetooth (registered trademark), dedicated short range communication (DSRC), or the like or communicates with various server devices via a wireless base station.

The HMI 30 presents various types of information to an occupant of the host vehicle M and receives an input operation from the occupant. The HMI 30 includes various display devices, speakers, buzzers, touch panels, switches, keys, and the like. The HMI 30 has a display device. The display device is a so-called multi-information display, which is a display device that is provided, for example, in a central part of an instrument panel of the host vehicle M and displays various types of information in the host vehicle M, of a speedometer that indicates a traveling speed of the host vehicle M or a tachometer that indicates the engine speed (a rotational speed) of an internal combustion engine included in the host vehicle M.

The vehicle sensor 40 includes, for example, a vehicle speed sensor that detects a speed of the host vehicle M, an acceleration sensor that detects an acceleration, a yaw rate sensor that detects an angular speed around a vertical axis, and an orientation sensor that detects a direction of the host vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies a position of the host vehicle M on the basis of a signal received from a GNSS satellite. The position of the host vehicle M may be specified or complemented by an inertial navigation system (INS) using an output of the vehicle sensor 40. The navigation HMI 52 includes a display device, a speaker, a touch panel, keys, and the like. The navigation HMI 52 may be partly or wholly shared with the HMI 30 described above. The route determiner 53, for example, determines a route (hereinafter, an on-map route) from the position of the host vehicle M specified by the GNSS receiver 51 (or any input position) to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The on-map route is output to the MPU 60. The navigation device 50 may perform route guidance using the navigation HMI 52 on the basis of the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block by referring to the second map information 62. The recommended lane determiner 61 determines in which lane from the left the host vehicle M travels. The recommended lane determiner 61 determines the recommended lane so that the host vehicle M can travel on a reasonable route for travel to a branch destination when there is a branch location in the on-map route. For example, when the host vehicle M reaches a predetermined distance before a branch road to which the host vehicle M is traveling, the recommended lane determiner 61 determines a lane connected to the branch road as the recommended lane. The recommended lane determiner 61 and the second map information 62 may be functional units or information included in another device such as the driving assistance device 100.

The second map information 62 is map information with higher accuracy than the first map information 54. The second map information 62 includes, for example, information on a center of the lane or information on a boundary of the lane. The second map information 62 may include road information, traffic regulation information, address information (an address and postal code), facility information, telephone number information, and the like. The second map information 62 may be updated at any time by the communication device 20 communicating with another device.

The driver monitor camera 70 is, for example, a digital camera using a solid-state imaging device such as a CCD or CMOS. The driver monitor camera 70 is attached to any location on the host vehicle M at a position and orientation at which a head of an occupant (hereinafter referred to as a driver) seated in a seat of the driver of the host vehicle M can be imaged from the front (in an orientation in which a face is imaged). For example, the driver monitor camera 70 is attached to an upper part of the display device provided in the central part of the instrument panel of the host vehicle M. The driver monitor camera 70 outputs, to the driving assistance device 100, an image obtained by imaging the vehicle cabin including the driver of the host vehicle M from a position at which the driver monitor camera 70 is disposed.

The driving operator 80 includes, for example, an operation switch of a direction indicator, an accelerator pedal, a brake pedal, a shift lever, and other operators, in addition a steering wheel 82. A sensor that detects an amount of operation or the presence or absence of an operation is attached to the driving operator 80, and a detection result thereof is applied to the driving assistance device 100, or some or all of the travel driving force output device 200, the brake device 210, and the steering device 220. The steering wheel 82 does not necessarily have to be annular but may be in the form of a modified steering wheel, joystick, buttons, or the like. A steering grip sensor 86 is attached to the steering wheel 82.

The steering grip sensor 86 is realized by, for example, a capacitance sensor or a piezoelectric element. The steering grip sensor 86 detects whether or not the driver is gripping the steering wheel 82. The gripping is a state in which the driver grips the steering wheel, a state in which a hand comes into contact with the steering wheel and a predetermined degree or more of force is applied to the steering wheel, or the like.

The steering grip sensor 86 may detect gripping based on an image captured by a camera or detect gripping using an optical scheme such as a radar device (a scheme that does not require contact with a sensor).

The driving assistance device 100 includes, for example, a recognizer 110, a driver recognizer 120, a speed controller 130, a lane keeping controller 140, a lane change controller 150, and a mode controller 160. The recognizer 110, the driver recognizer 120, the speed controller 130, the lane keeping controller 140, the lane change controller 150, and the mode controller 160 are realized, for example, by a hardware processor such as a central processing unit (CPU) executing a program (software). Some or all of these components may be realized by hardware (circuit; including circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device (a storage device including a non-transitory storage medium) such as an HDD or a flash memory of the driving assistance device 100 in advance or may be stored in a detachable storage medium such as a DVD or a CD-ROM and installed in the HDD or flash memory of the driving assistance device 100 by the storage medium (a non-transitory storage medium) being mounted in a drive device. A functional configuration including the speed controller 130, the lane keeping controller 140, the lane change controller 150, and the mode controller 160 is an example of a "controller".

The recognizer 110 recognizes a state such as a position, speed, and acceleration of an object present around the host vehicle M on the basis of information input from the camera 10, the radar device 12, and the LIDAR 14 via the object recognition device 16. The position of the object, for example, is recognized as a position at absolute coordinates with a representative point (a centroid, a drive shaft center, or the like) of the host vehicle M as an origin, and is used for control. The position of the object may be represented by a representative point such as a centroid or a corner of the object or may be represented by an area. The "status" of the object may include an acceleration or jerk of the object, or an "action status" (for example, whether or not the object is changing lanes or is about to change lanes).

The recognizer 110, for example, recognizes a lane (a traveling lane) in which the host vehicle M is traveling. For example, the recognizer 110 compares a pattern of road demarcation lines (for example, an arrangement of solid lines and broken lines) obtained from the second map information 62 with a pattern of road demarcation lines around the host vehicle M recognized from an image captured by the camera 10 to recognize the traveling lane. The recognizer 110 may recognize not only the road demarcation lines but also a traveling road boundary (a road boundary) including road demarcation lines, a road shoulder, a curb, a median strip, a guard rail, or the like to recognize the traveling lane. In this recognition, the position of the host vehicle M acquired from the navigation device 50 or a processing result of the INS may be additionally considered. The recognizer 110 recognizes a temporary stop line, an obstacle, a red signal, a toll gate, and other road events.

The recognizer 110 recognizes a position or posture of the host vehicle M with respect to the traveling lane when recognizing the traveling lane. The recognizer 110 may recognize, for example, a deviation of a reference point of the host vehicle M from a center of the lane and an angle formed between a traveling direction of the host vehicle M and a line connecting the center of the lane as a relative position and posture of the host vehicle M with respect to the traveling lane. Instead, the recognizer 110 may recognize, for example, a position of the reference point of the host vehicle M with respect to any one of side edge portions (the road demarcation line or the road boundary) of the traveling lane as the relative position of the host vehicle M with respect to the traveling lane.

The driver recognizer 120 detects whether the driver is in a predetermined state on the basis of the image captured by the driver monitor camera 70. The predetermined state is a state in which hands-off lane keeping control, which will be described later, is executable. Hands-off is a state in which the driver is not gripping the steering wheel, and hands-on is a state in which the driver grips the steering wheel. The state in which the hands-off lane keeping control is executable is a state in which the driver monitors the forward side. Monitoring the forward side means, for example, that the driver monitors the forward side so that the driver can rapidly perform takeover from control of the vehicle by the vehicle system 1 to an operation with respect to the vehicle by the driver. Monitoring the forward side means, for example, that a line of sight of the driver is directed to the forward side.

The speed controller 130 automatically controls the travel driving force output device 200 and the brake device 210 without depending on an operation of the driver to automatically control the speed of the host vehicle M. The speed controller 130 executes so-called adaptive cruise control (ACC).

For example, when another vehicle is not present in front of the host vehicle M and within a predetermined distance from the host vehicle M, the speed controller 130 automatically controls the travel driving force output device 200 and the brake device 210 without depending on an operation of the driver so that the host vehicle M moves at a speed set by the driver or a legal speed.

For example, when another vehicle is present in front of the host vehicle M and within the predetermined distance from the host vehicle M, the speed controller 130 automatically controls the travel driving force output device 200 and the brake device 210 without depending on an operation of the driver so that the host vehicle M follows the other vehicle. "Following" means that the host vehicle M travels while maintaining a position behind the other vehicle and at a predetermined distance from the other vehicle.

The lane keeping controller 140 controls the steering device 220 so that the host vehicle M does not deviate from the traveling lane. For example, the lane keeping controller 140 controls the steering device 220 so that the host vehicle M travels at a center or near the center of the traveling lane recognized by the recognizer 110. Hereinafter, this control may be referred to as "lane keeping control". The Lane keeping controller 140 performs hands-on lane keeping control and hands-off lane keeping control.

The hands-on lane keeping control is control that is executed in the state in which the driver is gripping the steering wheel (a state in which the steering grip sensor 86 is detecting gripping of the steering wheel). Condition under which the hands-on lane keeping control is executable are looser than the conditions under which the hands-off lane keeping control is executable. For example, the hands-on lane keeping control is executed on the condition that the speed of the host vehicle M is equal to or higher than a predetermined speed and the driver is monitoring the forward side.

The hands-off lane keeping control is control that is executed in a state in which the driver is not gripping the steering wheel (a state in which the steering grip sensor 86 does not detect gripping of the steering wheel). The hands-off lane keeping control is executable, for example, when the following conditions are satisfied. The conditions are that the speed of the host vehicle M is equal to or higher than the predetermined speed, that the host vehicle M travels on a predetermined road (for example, a road or a type of road set in advance as the hands-off lane keeping control being executable), and that the driver monitors the forward side. The hands-off lane keeping control is executed when the driver monitors the forward side, and the hands-off lane keeping control is not executed or stopped when the driver does not monitor the forward side.

The conditions under which the hands-on lane keeping control and the hands-off lane keeping control described above are executable are examples, and other conditions (for example, the host vehicle M follows a preceding vehicle) may be included, or some of the conditions may be omitted. The conditions under which the hands-on lane keeping control is executable may be looser than the conditions under which the hands-off lane keeping control is executable (the conditions under which the hands-off lane keeping control is executable may be stricter than the conditions under which the hands-on lane keeping control is executable).

The lane change controller 150 causes the host vehicle M to automatically change lanes. The lane change controller 150 causes the host vehicle M to automatically change lanes (ALC: auto lane change) when a lane change instruction is issued by the driver in a state in which the hands-off lane keeping control is being executed. The lane change instruction is an operation with respect to the operation switch of the direction indicator. The lane change instruction may be an operation different from the operation with respect to the operation switch of the direction indicator. For example, the lane change may be performed when a predetermined operation button is pressed.

The lane change controller 150 causes the host vehicle M to perform auto-lane change when the driver causes the host vehicle M to enter a branch road from the traveling lane to a destination in a state in which the hands-off lane keeping control is being executed. For example, when the host vehicle M travels in the traveling lane, the traveling lane is connected to the branch road, and the host vehicle M can enter the branch road from the traveling lane, the lane change controller 150 causes the host vehicle M to perform lane change from the traveling lane to the branch road.

The lane change controller 150 causes the host vehicle M to perform lane change to the branch lane on the basis of the approval of the driver when the destination of the host vehicle M is present in a branch lane direction in a state in which the hands-off lane keeping control is being executed. For example, when the host vehicle M travels in the traveling lane and needs to change lanes from the traveling lane to the branch lane, the driving assistance device 100 proposes to change the lane to the branch lane. When the driver approves the proposal, the lane change controller 150 causes the host vehicle M to change lanes from the traveling lane to a recommended lane. The lane change may be executed even when the hands-on lane keeping control is being executed.

The lane change controller 150 executes lane change on the condition that the driver grips the steering wheel (the steering grip sensor 86 detects gripping of the steering wheel). The lane change controller 150 executes the lane change when the driver grips the steering wheel and further when the following conditions are satisfied, for example.

The conditions are, for example, that there are no obstacles in a lane that is a lane change destination, that the host vehicle M does not interfere with other vehicles around the host vehicle M when the host vehicle M performs the lane change, that a section is not a section in which lane change is prohibited (there is no road marking or sign indicating prohibition of the lane change), that the lane that is a lane change destination is recognized (actually present), that a yaw rate detected by the vehicle sensor 40 is smaller than a threshold, and that a radius of a curvature of a road on which the host vehicle M is traveling is equal to or larger than a predetermined value. The conditions for executing the lane change may include other conditions, or some of the conditions may be omitted.

Figure 2:
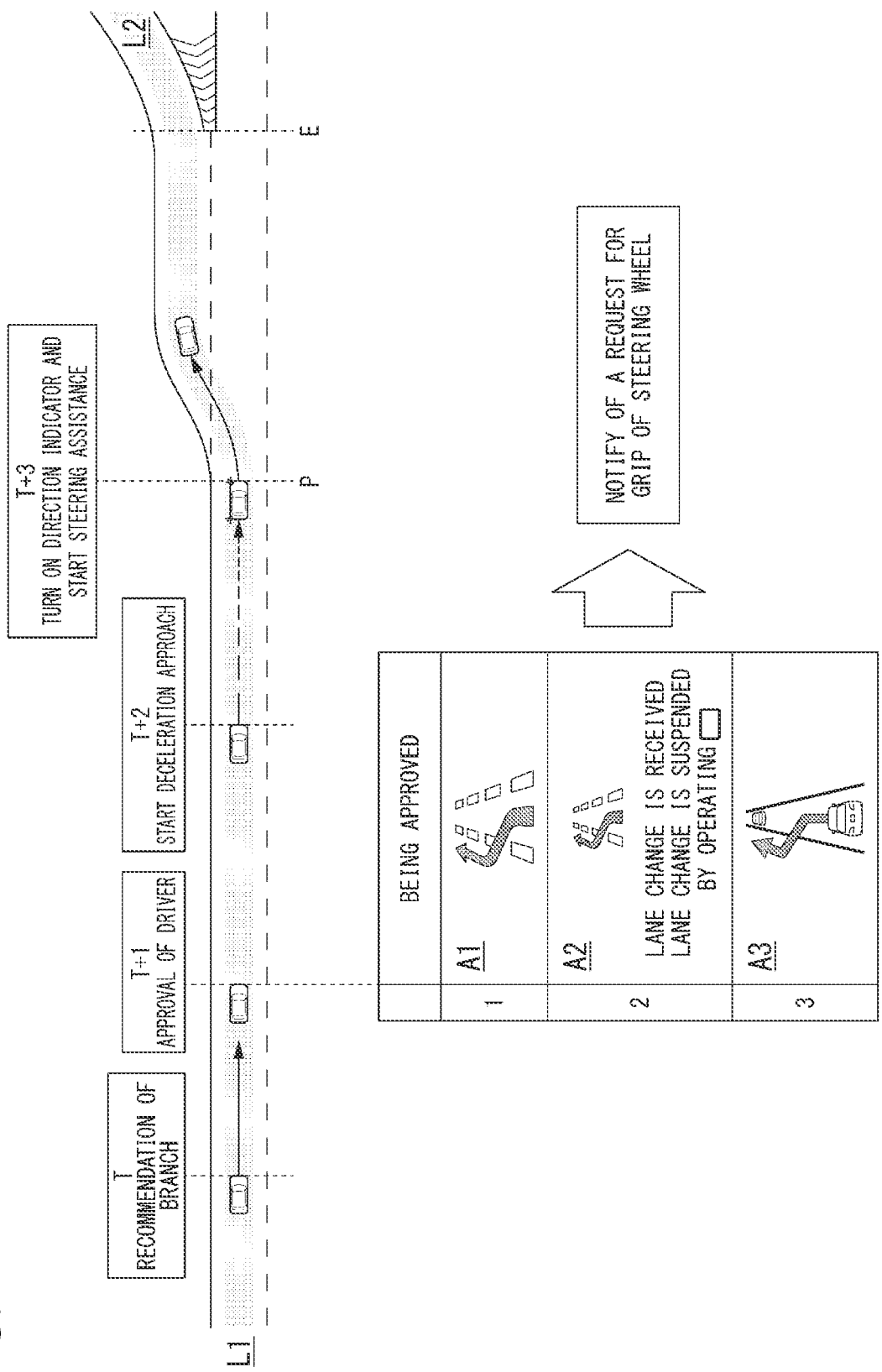
FIG. 2 is a diagram for describing branch control.

The mode controller 160 sets or stops a mode executed by the driving assistance device 100. The mode controller 160 instructs the respective controller to perform execution or stop of the hands-off lane keeping control, the hands-on lane keeping control, the lane change (ALC) by the lane change controller 150, the control (for example, ACC) executed by the speed controller 130, and the like described above, to control the mode executed by the driving assistance device 100. The mode controller 160 combines the controls executed by the respective controllers described above to realize control according to a future traveling schedule of the host vehicle M. For example, when the host vehicle M travels in the branch lane (branch road) and is directed to a destination, the mode controller 160 performs branch recommendation, deceleration approach, lane change (lane change according to steering assistance) by lane change controller 150, lane keeping control and speed control after the lane change, and the like, as shown in FIG. 2 to be described later. Hereinafter, control after the branch recommendation is approved by the driver may be referred to as "branch control".

The travel driving force output device 200 outputs a travel driving force (torque) for traveling of the vehicle to driving wheels. The travel driving force output device 200 includes, for example, a combination of an internal combustion engine, an electric motor, a transmission, and the like, and an electronic control unit (ECU) that controls these. The ECU controls the above configuration according to information input from the driving assistance device 100 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to the information input from the driving assistance device 100 or the information input from the driving operator 80 so that a brake torque according to a braking operation is output to each wheel.

The steering device 220 includes, for example, a steering ECU and an electric motor. The electric motor, for example, changes orientations of steerable wheels by causing a force to act on a rack and pinion mechanism. The steering ECU drives the electric motor according to the information input from the driving assistance device 100 or the information input from the driving operator 80 to change the orientations of the steerable wheels.

[Branch Control (Part 1)]

FIG. 2 is a diagram for describing branch control. A route to a destination of the host vehicle M is a route in which the host vehicle M travels in a lane L1, changes lanes to a branch lane L2 (branch road) connected to the lane L1, and travels in the branch lane L2. It is assumed that the host vehicle M is traveling in the lane L1 under ACC and hands-off lane keeping control.

At time T, the mode controller 160 uses the HMI to notify the driver of the branch recommendation. For example, the branch recommendation is performed a predetermined distance before a reference position P at which the traveling lane L1 connects to the branch lane L2. The branch recommendation is, for example, recommendation of branch control in which the speed and steering of the host vehicle M are automatically controlled and the host vehicle M enters the branch lane L2.

At time T+1, when the driver approves the recommendation in response to the branch recommendation, mode controller 160 causes an image A1 to be displayed in a first area of the display, an image A2 to be displayed in a second area, and an image A3 to be displayed in a third area. When a predetermined button is operated, the mode controller 160 recognizes that the branch recommendation has been approved. The mode controller 160 recognizes that the recommendation has been approved when hands-on is performed in addition to (or instead of) the operation of the predetermined button.

The first area, the second area, and the third area may be different displays (display devices), or may be different areas in one display. For example, the first area, the second area, and the third area may be different areas in a multi-information display provided in front of a seat of the driver. The image displayed in the first area is, for example, an image corresponding to an indicator that notifies the driver of a state of the host vehicle M.

The image A1, the image A2, and the image A3 are images that are displayed in response to the reception of the approval. The image A1 is, for example, an image that recommends lane change to the branch lane L2. The image A2 is, for example, an image including receiving the lane change to the branch lane L2 with the approval of the driver, being able to suspend the lane change when the driver operates the predetermined button, and the image A1. The image A2 may include information indicating that the driving assistance ends when the host vehicle M reaches an end position E according to the branch control. The image A3 is, for example, an image including a situation around the host vehicle M and a future travel trajectory of the host vehicle M. The situation around the host vehicle M is, for example, an image showing information on other vehicles, road demarcation lines, or the like detected by the vehicle system 1.

At time T+2, the mode controller 160 causes the speed controller 130 to start the deceleration approach. The deceleration approach is control for adjusting the speed so that the host vehicle M enters the branch lane L2. The deceleration approach is started the predetermined distance before the reference position P. The deceleration approach may be arbitrarily set according to a structure of the road and the speed of the host vehicle M. For example, the deceleration approach is executed so that the host vehicle M can smoothly change lanes from the traveling lane L1 to the branch lane L2 without decelerating at a predetermined degree or more.

At time T+3, the mode controller 160 turns on the direction indicator. Thereafter, the mode controller 160 instructs the lane change controller 150 to change lanes, and the lane change controller 150 causes the host vehicle M to change lanes from the traveling lane L1 to the branch lane L2. That is, the steering assistance for branching is started. When hands-on is not a condition of the approval, a notification for requesting the driver to grip the steering wheel is sent to the driver before the start of the steering assistance, and when the driver grips the steering wheel, the lane change is executed. The direction indicator is turned on at the predetermined distance before the reference position P or at the reference position P.

The lane change controller 150 then causes the host vehicle M to change lanes. After the lane change is completed, the hands-on lane keeping control (or the hands-off lane keeping control) and the speed control are executed, and the host vehicle M travels in the branch lane L2 at an appropriate speed without depending on the operation of the driver.

When the host vehicle M reaches the end point position E, the mode controller 160 stops controlling the speed controller 130, the lane keeping controller 140, and the lane change controller 150. The end point position E is any position such as, for example, a start point of a guided fluid (zebra zone). When the host vehicle M reaches the end point position E, the driver performs manual driving (the driver operates the accelerator pedal, the brake pedal, and the steering wheel) to control the host vehicle M.

In the above example, a preceding vehicle has not been considered, but when there is a preceding vehicle, a speed of the preceding vehicle or the distance between the host vehicle M and the preceding vehicle is taken into consideration, and the deceleration approach is executed.

As described above, the driving assistance device 100 performs the branch control described above to cause the host vehicle M to change lanes from the traveling lane L1 to the branch lane L2. Accordingly, the host vehicle M enters the branch lane L2 without depending on the operation of the driver.

[Flowchart (Part 1)]

Figure 3:
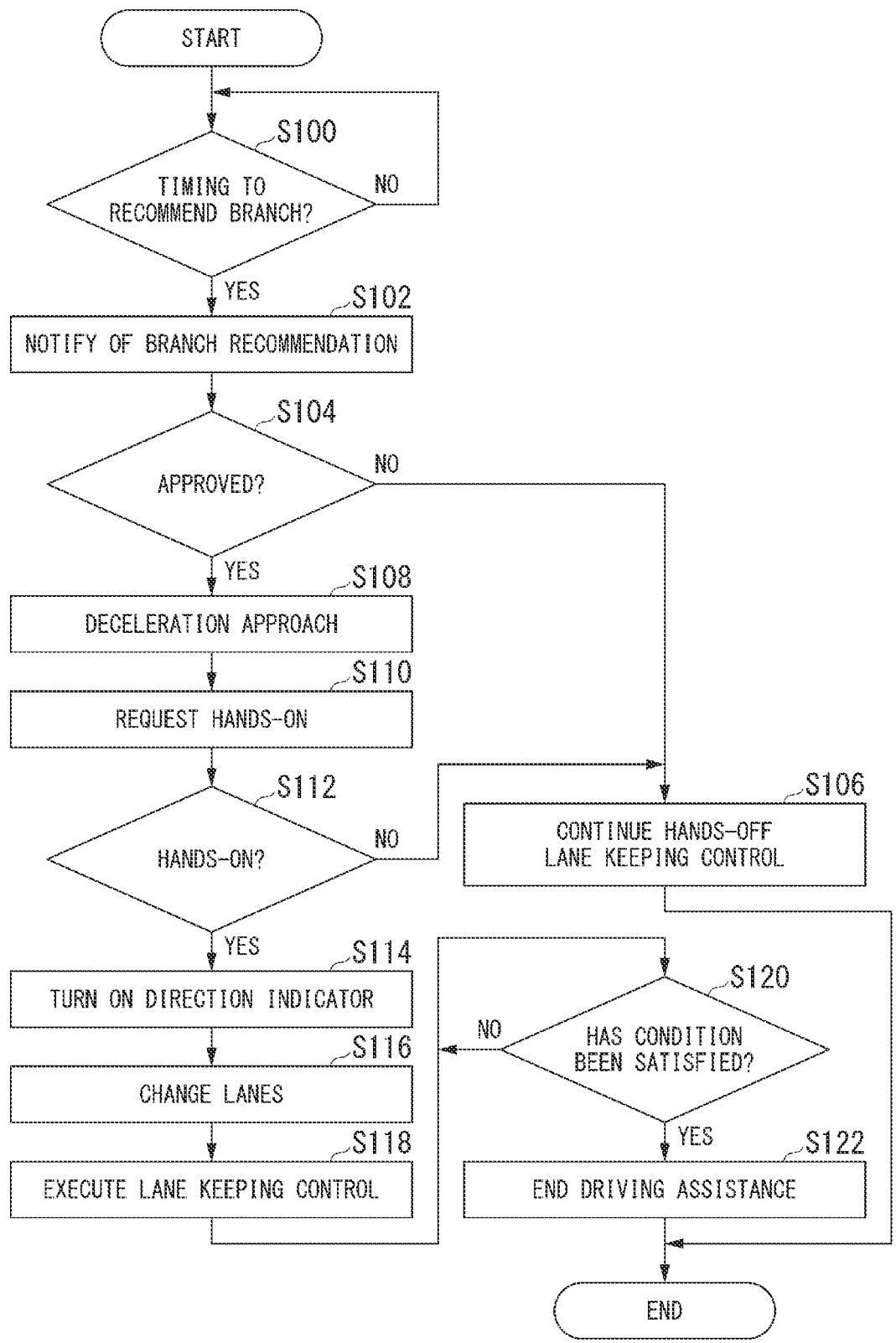
FIG. 3 is a flowchart showing an example of a flow of processing that is executed by a driving assistance device.

FIG. 3 is a flowchart (part 1) showing the example of the flow of processing that is executed by the driving assistance device 100. This processing is executed when the ACC and the hands-off lane keeping control are executed and the host vehicle M plans on traveling in the traveling lane L1 and entering the branch lane L2.

First, the mode controller 160 determines whether or not it is a timing to recommend a branch (step S100). When it is a timing to recommend a branch, the mode controller 160 notifies of a branch recommendation (step S102). Next, the mode controller 160 determines whether or not the recommendation has been approved by the driver (step S104). When approval is not performed for a predetermined time or until the host vehicle M reaches a position at which preparation of lane change is started, the mode controller 160 continues the hands-off lane keeping control (step S106).

When the recommendation is approved, the mode controller 160 causes the speed controller 130 to execute the deceleration approach (step S108). Next, the mode controller 160 requests the driver to perform hands-on using the HMI 30 (step S110). Next, the mode controller 160 determines whether or not the driver has performed hands-on on the basis of a detection result of the steering grip sensor 86 (step S112). When the driver has not performed the hands-on within a predetermined time since the request in step S110 has been started, the processing proceeds to step S106. The hands-on may be a condition of approval in step S104. In this case, the processing of steps S110 and S112 are omitted, and the deceleration approach is started when the approval button has been operated and hands-on has been performed.

When the driver performs the hands-on within the predetermined time after the request in step S110 has been started, the mode controller 160 turns on the direction indicator (step S114). Next, the mode controller 160 causes the host vehicle M to change lanes from the traveling lane L1 to the branch lane L2 (step S116). The mode controller 160 causes the host vehicle M to start changing lanes. For example, the mode controller 160 causes the host vehicle M to be closer to the branch lane L2, or causes the host vehicle M to be directed to the branch lane L2.

Next, the mode controller 160 executes the lane keeping control after the lane change is completed (step S118). For example, the mode controller 160 determines that the lane change is completed when the host vehicle M is located at or near a center of branch lane L2. The mode controller 160 executes the hands-on lane keeping control (or the hands-off lane keeping control) to control the host vehicle M so that the host vehicle M does not deviate from branch lane L2. For example, when the lane change starts, the lane keeping control is not stopped, vehicle change control is preferentially executed over the lane keeping control, and when the lane change is completed, the lane change control is stopped and the lane keeping control is executed.

Next, the mode controller 160 determines whether or not a condition for ending the branch control is satisfied (step S120). When the condition for ending the branch control is satisfied, the mode controller 160 ends branch control, that is, driving assistance (assistance of steering and acceleration/deceleration control) (step S122). Accordingly, processing of one routine in the present flowchart ends. An order of the above processing may be changed, some of the processing may be omitted, and other processes may be added (the same applies to other flowcharts).

The condition for ending the branch control is that the host vehicle M has reached the end position E or that the host vehicle M has reached a predetermined position, as described above. In this case, the driving assistance ends.

As described above, the driving assistance device 100 can smoothly cause the host vehicle M to change lanes to the branch lane L2. This improves convenience for a user.

Hereinafter, processing in a case in which the specific event has occurred in the branch control will be described.

[Flowchart (Part 2)]

Figures 4, 5:
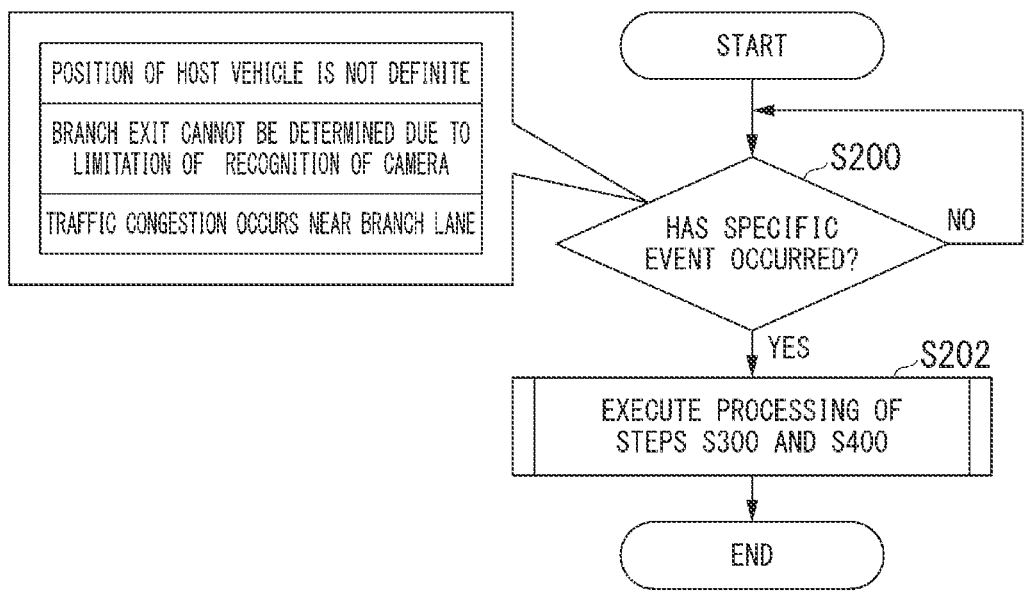
FIG. 4 is a flowchart (part 2) showing the example of the flow of processing that is executed by the driving assistance device.
FIG. 5 is a diagram for describing an overview of processing when a specific event has occurred.

FIG. 4 is a flowchart (part 2) showing the example of the flow of processing that is executed by the driving assistance device 100. First, mode controller 160 determines whether or not the specific event has occurred (step S200). When the specific event has occurred, processing of step S300 in FIG. 8 and step S400 in FIG. 11, which will be described later, are executed (step S202).

The specific event is, for example, any of the following (1), (2), or (3). (1) to (3) are examples, and the specific event may include other events.

(1) is that a position of the host vehicle M is not definite. When highly accurate position information of the host vehicle M cannot be acquired, the specific event is regarded as having occurred. For example, when the driving assistance device 100 cannot acquire map information or cannot ascertain the position of the host vehicle M, the specific event is regarded as having occurred.

(2) is that branch exit cannot be determined due to a limitation of recognition of surroundings by the camera 10, other sensors, or the like. For example, when the branch lane L2 cannot be recognized or when the branch lane L2 or surroundings thereof cannot be sufficiently recognized, the specific event is regarded as having occurred.

(3) is that traffic congestion occurs in the branch lane or near the branch lane. For example, when vehicles form a line in the branch lane or near the branch lane (for example, a road side zone) or when a speed of a preceding vehicle slows down a predetermined amount or more, the specific event is regarded as having occurred.

[Overview of Processing in Case in which Specific Event has Occurred]

FIG. 5 is a diagram for describing an overview of processing when the specific event has occurred. When the specific event has occurred before the start of the steering assistance, the acceleration is suppressed and lane keeping control is executed in the traveling lane (a lane before the lane change). When the specific event has occurred after the steering assistance starts, the acceleration is suppressed and the lane keeping control is interrupted.

"Before the start of the steering assistance" means before the lane change controller 150 starts causing the host vehicle M to change lanes. "Before the start of the steering assistance" is for example, before the host vehicle M moves for lane change. "Before the start of the steering assistance" is, for example, before the host vehicle M starts lateral movement to change lanes.

Although a case in which the specific event has occurred before the start of the steering assistance and after the start of the steering assistance will be described hereinafter, turning-on of the direction indicator may be regarded as the start of lane change, and the same processing may be performed when the specific event has occurred before the direction indicator is turned on and after the direction indicator is turned on ("before the start of the steering assistance" may be read as "before turning-on of the direction indicator, and "after the start of the steering assistance" may be read as "after turning-on of the direction indicator). Further, alternatively, the same processing may be performed when the specific event has occurred before or after a predetermined condition is satisfied. The predetermined condition is, for example, that the host vehicle M has approached within a predetermined distance from the branch lane L2 in a width direction, or that the host vehicle M has reached the branch lane L2.

When the specific event has occurred after the branch recommendation is made, the branch recommendation is cancelled, and when the specific event has occurred after the branch recommendation is approved, the approval and the branch control are cancelled.

[Processing in Case in which Specific Event has Occurred Before Start of Steering Assistance]

Figure 6:
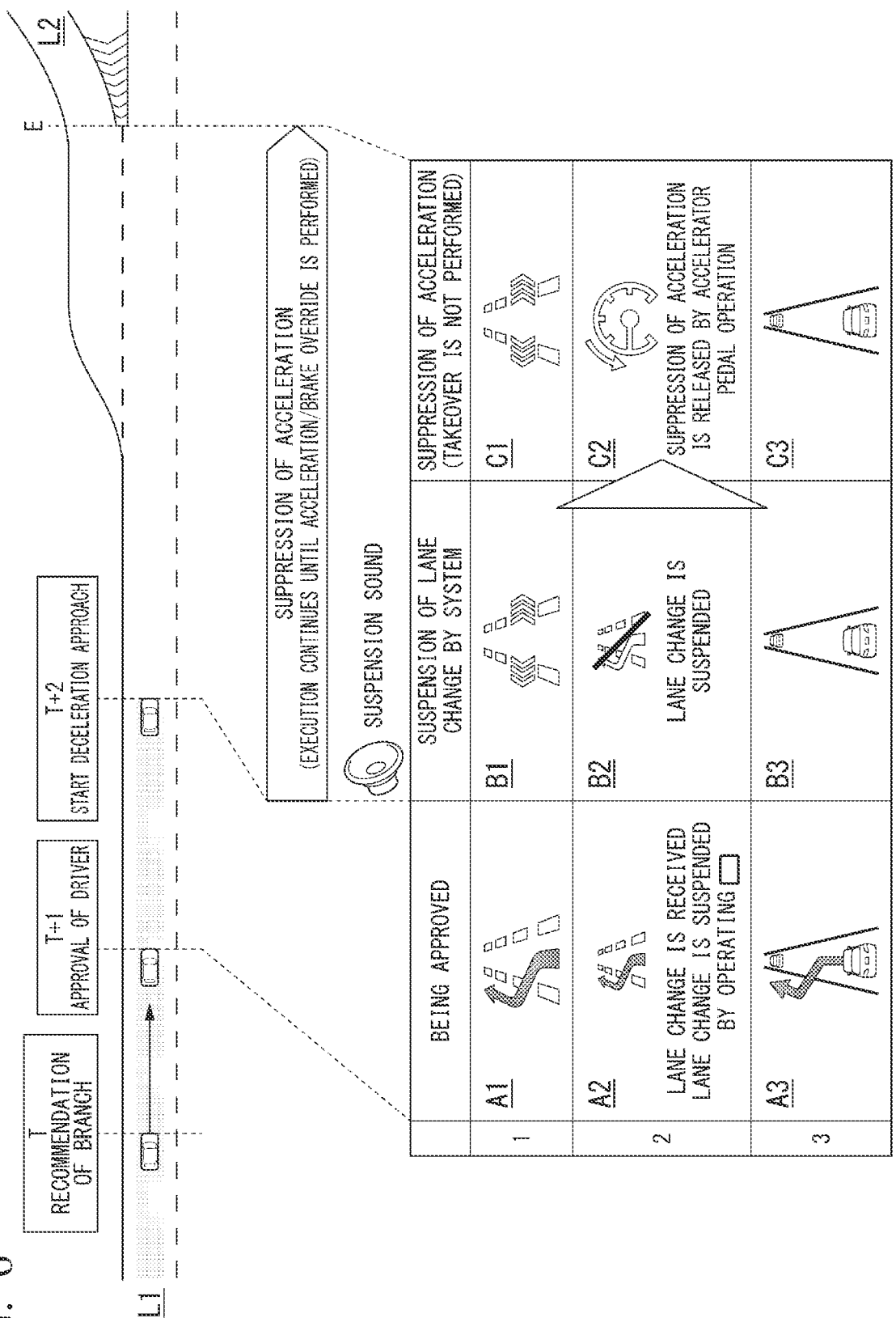
FIG. 6 is a diagram for describing processing when the specific event has occurred before start of steering assistance.

FIG. 6 is a diagram for describing processing when the specific event has occurred before the start of the steering assistance. Differences from FIG. 2 will be mainly described.

When the specific event has occurred after the deceleration approach is started at time T+2 and before the steering assistance is started, the mode controller 160 starts suppressing acceleration while continuing the hands-off lane keeping control. When the driver does not indicate the intention to release the suppression of the acceleration, the suppression of the acceleration continues, and when the driver indicates the intention to release the suppression of the acceleration, the suppression of the acceleration is released.

For example, when the following conditions are satisfied, the suppression of the acceleration is released. When the following conditions are satisfied, this is a behavior in which it is estimated that the driver himself or herself has an intention to control the speed, and thus, the suppression of the acceleration is released.

(1) A switch has been operated to bring the ACC to an OFF state. This is because when this operation is regarded as there being an intention to release the suppression of the acceleration.

(2) The brake pedal is operated by the driver. For example, the driver has operated the brake pedal in a predetermined amount of depression (the brake pedal has been operated in an amount of depression of the brake pedal at which the ACC is controlled to be brought to the OFF state).

(3) The accelerator pedal is operated by the driver. This is because it is estimated that the driver intends to accelerate, for example, when the driver has operated the accelerator pedal in a predetermined amount of depression.

(4) An operation for a setting in a direction in which a set speed of the ACC increases has been performed. For example, the driver has set the set speed to 80 km/h to 85 km/h. Since an operation in a direction in which the set speed decreases is not an intention of the driver to accelerate, the suppression of the acceleration continues.

(5) The vehicle system 1 has performed control to bring the ACC to the OFF state. For example, when the driver performs manual driving and transition to a manual driving mode occurs, the suppression of the acceleration is released and the ACC is brought to the OFF state. Although it is possible for the driver to perform a predetermined operation to reset the ACC, a time from the start of the deceleration approach to the host vehicle M reaching the branch lane L2 is short, and it is estimated that the lane change to the branch lane is completed at the time of resetting. Therefore, even when the suppression of the acceleration is released when the condition (5) is satisfied, no problem is considered to occur.

When the host vehicle M reaches the end position E, the driving assistance may be ended or may be continued. For example, when there is a predetermined road structure (for example, a junction) ahead of the end position E, the driving assistance may be continued. When the host vehicle M reaches the end position E, the suppression of the acceleration may be released or may be continued. For example, when the host vehicle M reaches the end position E and the driving assistance ends, the suppression of the acceleration is released and the speed of the host vehicle M is controlled by the operation of the driver. For example, when the driver does not control the speed, the host vehicle M decelerates from a speed when the suppression of the acceleration has been released. When there is a junction (for example, branching, merging, or connection of the road) ahead of the end position E and the driving assistance continues, the suppression of the acceleration continues. Even when the host vehicle M travels in the traveling lane L1 without changing lanes, the driving assistance may be ended at the end position E and the suppression of the acceleration may be released or one or both of the speed control and the lane keeping control according to the ACC may be resumed.

As described above, the driving assistance device 100 can control the host vehicle M so that the state of the host vehicle M is stabilized without hindering the operation of the driver even in a case in which the specific event has occurred before the start of the steering assistance.

When the specific event occurs at the above timing, the mode controller 160 causes images B1, B2, and B3 shown when the lane change by the vehicle system 1 is suspended to be displayed on the display, and then, causes images C1, C2, and C3 shown when the suppresses of the acceleration is executed to be displayed on the display. The images B1 and C1 are displayed, for example, in the first area, the images B2 and C2 are displayed, for example, in the second area, and the images B3 and C3 are displayed, for example, in the third area.

The image B1 is an image showing that the lane change recommendation by the vehicle system 1 is not made, and the lane change can be performed by the operation of the driver. In a case in which the image B1 is displayed, the lane change can be performed by the lane change controller 150 when the driver operates the operation switch of the direction indicator. The image B2 is an image showing that the vehicle system 1 has suspended the lane change. The image B3 is, for example, an image showing a surroundings situation of the host vehicle M (the other vehicles or road demarcation lines detected by the vehicle system 1). At a timing when the images B1, B2, and B3 are displayed, for example, a suspension sound indicating that the lane change by the vehicle system 1 is suspended is output to the driver.

The images C1, C2, and C3 are images that are displayed on the display when the driver does not perform an acceleration/deceleration operation (takeover). The image C1 is an image similar to the image B1, the image C2 is an image showing that the suppression of the acceleration can be released due to an operation with respect to the accelerator pedal, and the image C3 is, for example, an image showing the surroundings situation of the host vehicle M (the other vehicles or road demarcation lines detected by the vehicle system 1). The images are examples, and other images may be displayed.

When the specific event occurs at the above timing, the mode controller 160 executes the suppression of the acceleration and provides the driver with an image according to the control. This improves convenience for a user.

Figure 7:
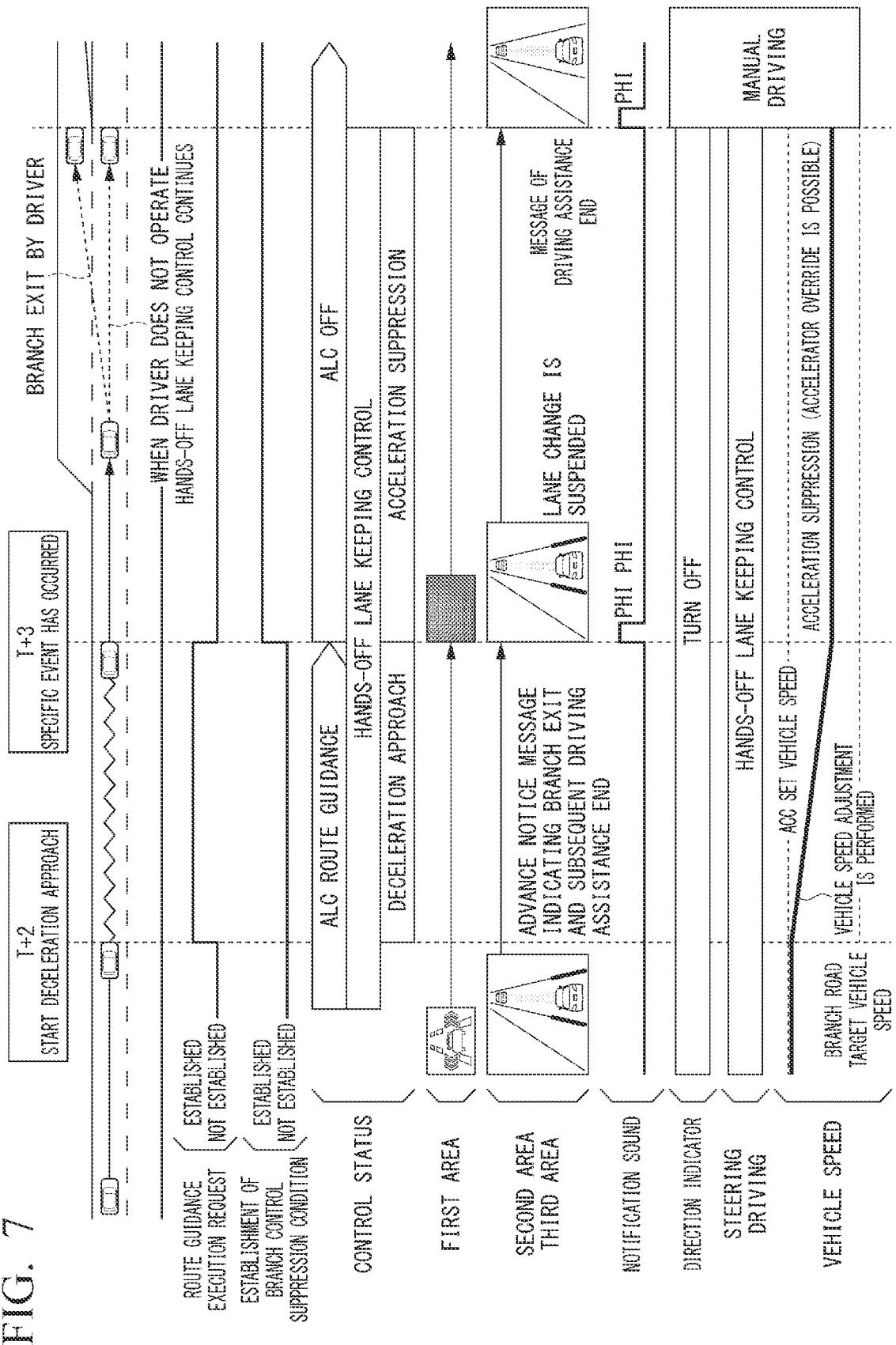
FIG. 7 is a timing chart in a case in which the specific event has occurred.

FIG. 7 is a timing chart in a case in which a specific event has occurred. In the following description, it is assumed that the specific event has occurred at time T+3. At time T+2, when the deceleration approach is started, a route guidance execution request is established, and processing for entering the branch lane L2 is started. For example, the driving assistance device 100 generates a trajectory for entering the branch lane L2 from the traveling lane L1 and generates a plan including a timing at which the direction indicator is turned on, a timing at which the lane change is started, and the like. Up to time T+3, ALC route guidance (control for causing the host vehicle M to travel along a route for lane change) and the hands-off lane keeping control are executed. For example, the lane keeping controller 140 and the lane change controller 150 are in operation.

Until time T+3, an image showing that the branch control is executed is displayed in the first area, an advance notice message indicating branch exit and subsequent driving assistance end is displayed in the second area, and the image B3 is displayed in the third area.

In this timing chart, the direction indicator is turned off and the steering drive is in a state in which the hands-off lane keeping control is performed. At time T+2, the vehicle speed decreases from a vehicle speed set in ACC to a target vehicle speed of the branch road. Vehicle speed adjustment for entering the branch road is performed. The target vehicle speed of the branch road is a speed that depends on a length of the branch road. For example, when the branch road is shorter, the target vehicle speed may decrease, and when the branch road is longer, the target vehicle speed may increase.

At time T+3, when the specific event has occurred, the route guidance execution request is not established, and a branch control suppression condition is established. Accordingly, the ALC route guidance enters an OFF state, and the lane change controller 150 enters an OFF state. A behavior of the lane keeping controller 140 continues.

At time T+3, the image showing that the branch control is executed is erased, a message indicating that the lane change is suspended is displayed in the second area, and the image B3 is displayed in the third area.

At time T+3, the direction indicators are turned off and the steering drive is in a state in which the hands-off lane keeping control is performed. A notification sound is output at time T+3. At time T+3 and after time T+3, the vehicle speed is maintained at a speed when the specific event has occurred. That is, acceleration is suppressed. In this case, when there is a preceding vehicle that is slower than the host vehicle M, the speed of the host vehicle M is controlled so that a distance between the host vehicle M and the preceding vehicle is equal to or greater than a predetermined distance. When there is a preceding vehicle that is faster than the host vehicle M, the acceleration is suppressed, and thus, a distance between the preceding vehicle and the host vehicle M increases.

When the host vehicle M reaches the branch lane L2 or near the branch lane L2 and the driver operates the steering wheel to cause the host vehicle M to change lanes to the branch lane L2, the host vehicle M enters the branch lane L2. When the host vehicle M reaches the branch lane L2 or near the branch lane L2 and the driver does not operate the steering wheel to cause the host vehicle M to change lanes to the branch lane L2, the hands-off lane keeping control is maintained and thus, the host vehicle M travels in the traveling lane L1. In these cases, when an operation for releasing the suppression of the acceleration is not performed, the suppression of the acceleration continues.

When the host vehicle M reaches the end position E, a message indicating the end of the driving assistance is displayed in the second area, a notification sound is output, and the suppression of the acceleration is released. The host vehicle M transitions to a state in which the host vehicle M is controlled by manual driving (the manual driving mode). The speed and steering of the host vehicle M are not controlled in the vehicle system 1 but are controlled by the driver. When the host vehicle M travels in the traveling lane L1 and reaches the end position E, the hands-off lane keeping control or the hands-on lane keeping control may be continued instead of the above, or the hands-off lane keeping control or the hands-on lane keeping control may be resumed automatically and ACC speed control may be resumed after the driving assistance ends.

As described above, the driving assistance device 100 can control the host vehicle M so that the operation of the driver is not hindered and further stabilize the state of the host vehicle M in a case in which the specific event has occurred before the steering assistance.

Figure 8:
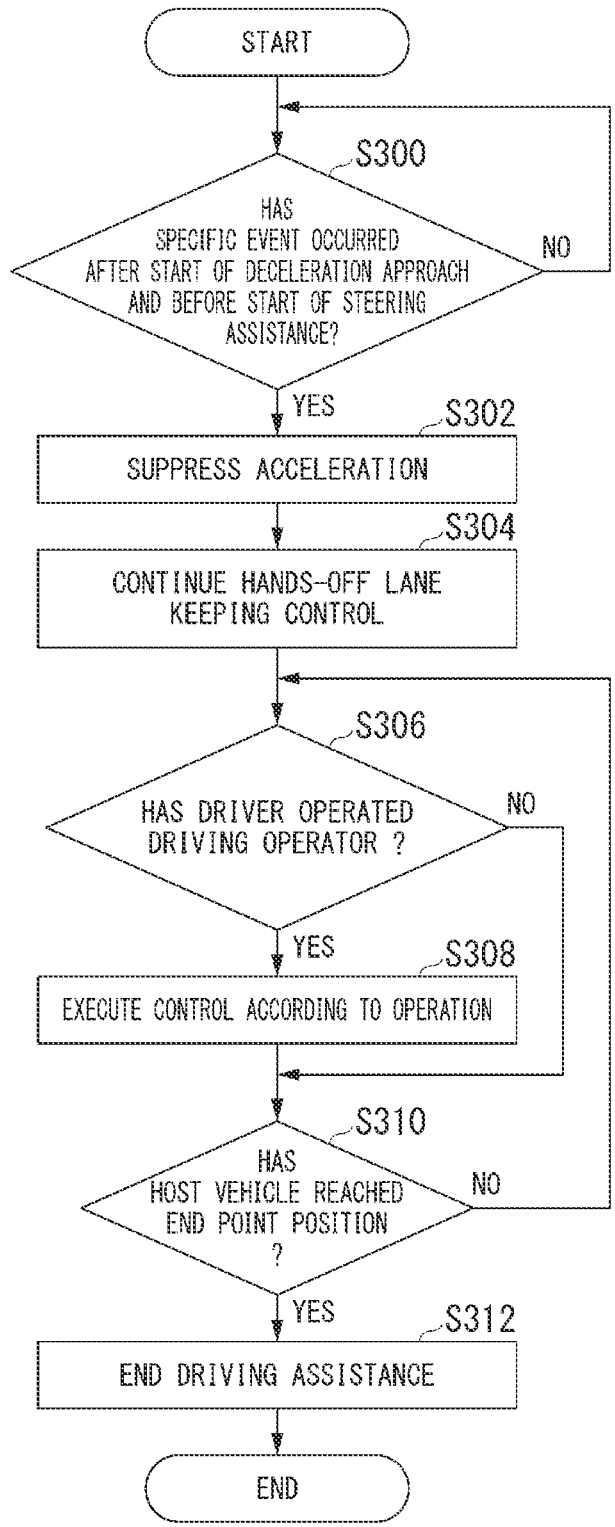
FIG. 8 is a flowchart showing an example of a flow of processing that is executed by the driving assistance device in a case in which the specific event has occurred.

FIG. 8 is a flowchart showing an example of a flow of processing that is executed by the driving assistance device 100 in a case in which the specific event has occurred.

First, the mode controller 160 determines whether or not the specific event has occurred after start of the deceleration approach and before start of the lane change (step S300). When the specific event has occurred after the start of the deceleration approach and before the start of the lane change, the mode controller 160 suppresses the acceleration (step S302) and continues the hands-off lane keeping control (step S304).

Next, the mode controller 160 determines whether or not the driver has operated the driving operator 80 (step S306). When the driving operator 80 is operated, the mode controller 160 executes control according to the operation (step S308) and proceeds to the processing of step S310. When the driving operator 80 is not operated, in step S310, the mode controller 160 determines whether or not the host vehicle M has reached the end point position (step S310). When the host vehicle M has not reached the end point position, the processing returns to step S306.

When the driver operates the steering wheel before reaching the end point position, the steering is controlled according to the operation. For example, when the driver temporarily operates the steering wheel and then does not perform the operation, the lane keeping control may be resumed or may not be resumed. When the driver operates the accelerator or the brake pedal before reaching the end point position, the suppression of the acceleration is released.

When the end point position is reached, the mode controller 160 ends the driving assistance (step S312). This causes the transition to manual driving.

Thus, the driving assistance device 100 can control the host vehicle M so that the operation of the driver is not hindered and further stabilize the state of the host vehicle M in a case in which the specific event has occurred before the steering assistance.

[Processing when the Specific Event has Occurred after Start of Steering Assistance]

Figure 9:
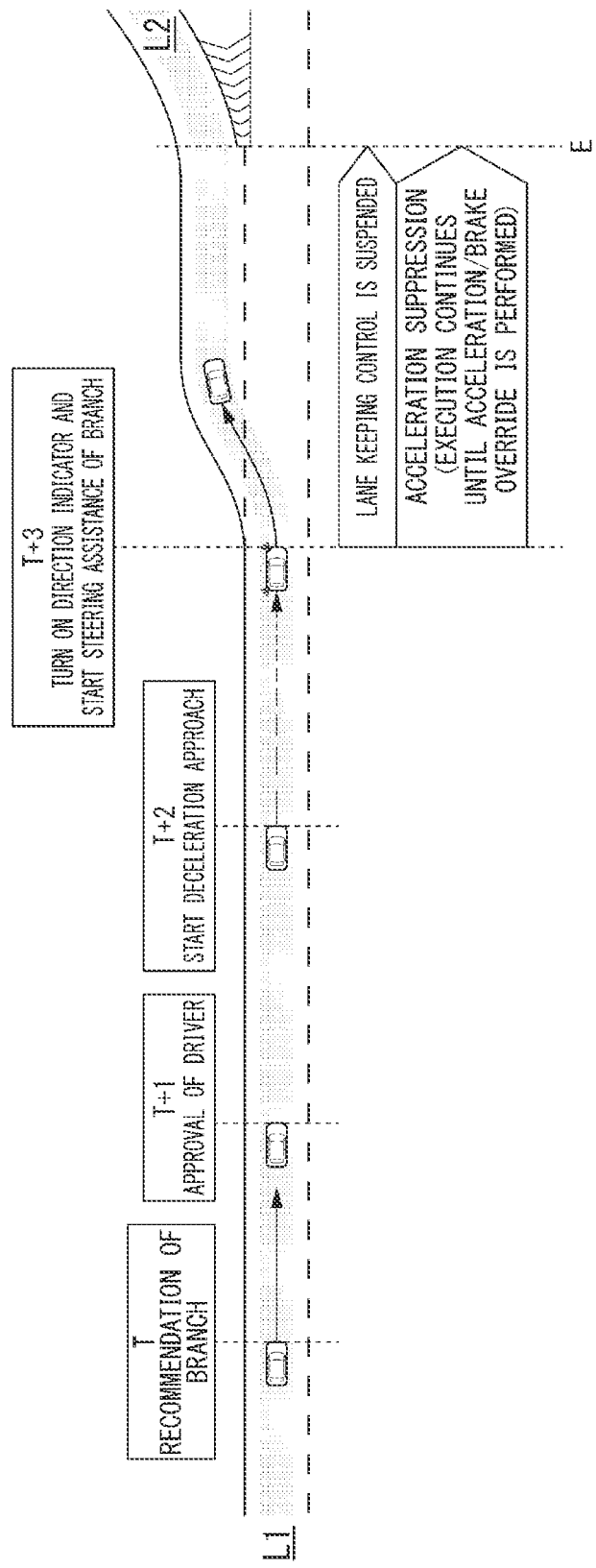
FIG. 9 is a diagram for describing processing when the specific event has occurred after the start of the steering assistance.

When the specific event has occurred after the start of the steering assistance, the driving assistance device 100 stops the lane keeping control and the lane change control, and further performs suppression of acceleration (stop mode is executed). FIG. 9 is a diagram for describing processing when the specific event has occurred after the start of the steering assistance. In a case in which the specific event has occurred after steering assistance is started at time T+3, the mode controller 160 starts the suppression of the acceleration together with stopping the lane keeping control. In this case, steering and acceleration/deceleration operations are entrusted to the operation of the driver.

In this case, the driver operates the steering wheel to control the host vehicle M for lane change or traveling in the traveling lane.

The conditions for releasing the suppression of the acceleration are, for example, the same conditions as described above. A condition for releasing the stop of the lane keeping control is (A condition of stop mode is), for example, that the following conditions are satisfied. The lane keeping control to be resumed as described hereinafter may be the hands-on lane keeping control or may be the hands-off lane keeping control (the stop mode is end and it is transferred to mode different from the stop mode).

(A) The host vehicle M has reached the end position E.

This is because, in this case, it is considered that the host vehicle passes through a section for entering the branch lane, and there will be no problem even when the lane keeping control is resumed thereafter. For example, this is because the host vehicle M can travel in the branch lane L2 without performing a behavior for returning to the traveling lane L1 when the host vehicle M travels in the branch lane L2, and the host vehicle M can travel in the traveling lane L1 without performing a behavior for entering the branch lane L2 when the host vehicle M travels in the traveling lane L1. The release in this case means that the lane keeping control can be started. For example, when the host vehicle M reaches the end position E, the driving assistance ends and the stop of the lane keeping control is released. Since the driving assistance does not end in a state in which the lane keeping control is stopped, the lane keeping control can be resumed by a predetermined operation (or automatically) after the driving assistance ends. For example, the driving assistance device 100 may not resume the lane keeping control when the host vehicle M travels in the branch lane L2 and may automatically resume the lane keeping control when the host vehicle M travels in the traveling lane L1.

(B) The host vehicle M has traveled in the branch lane L2 for a predetermined time.

(C) The host vehicle M has traveled a predetermined distance in the branch lane L2.

This is because, in the case of (B) or (C), the lane keeping control is resumed and the driver convenience is improved even when the branch lane L2 is long or when the map information cannot be used after the lane change. For example, when the branch road is long or the host vehicle M has traveled for a predetermined time after changing lanes, the stop of the lane keeping control is released and the lane keeping control is resumed. Thereafter, when the host vehicle M reaches the end position E, the driving assistance may end and the lane keeping control may end.

(D) The vehicle system 1 performs control to bring the lane keeping control to an OFF state. For example, when transition to a state in which the driver performs manual driving has occurred, the stop of the lane keeping control is released. Although the driver can perform a predetermined operation to reset the lane keeping control, a time from the start of the operation assistance to the lane change of the host vehicle M is short, and it is estimated that the lane change to the branch lane is completed at the time of resetting. Therefore, in a case in which the condition (D) is satisfied, it is considered that no problem occurs even when the stop of the lane keeping control is released.

Figure 10:
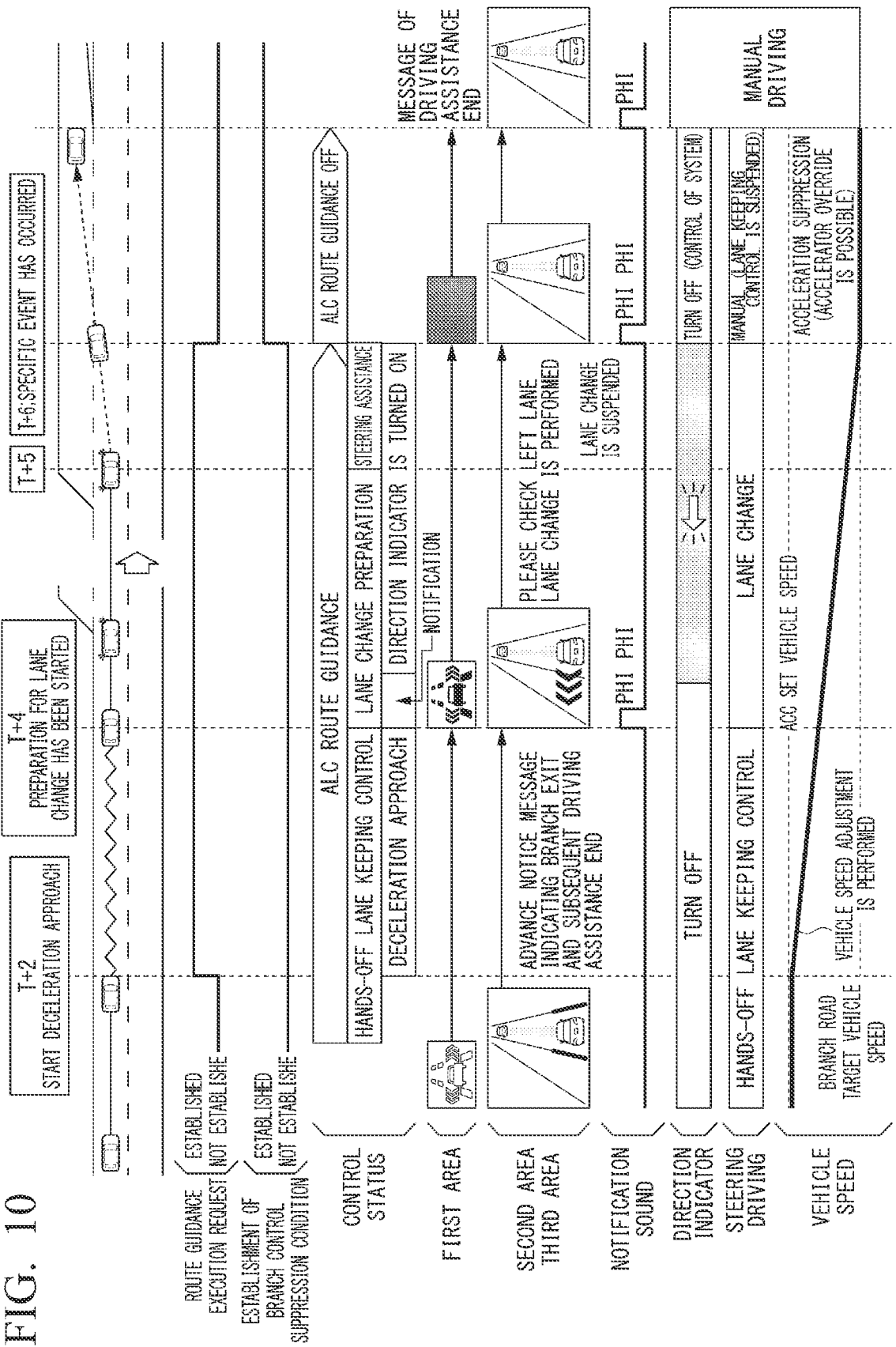
FIG. 10 is a timing chart in a case in which the specific event has occurred.

FIG. 10 is a timing chart in a case in which a specific event has occurred. Time T+4 is a timing at which preparation for lane change has been started after the deceleration approach has been started. Time T+5 is a timing when the lane change has been started.

In the following description, it is assumed that a specific event has occurred at time T+6 after the lane change has been started. That is, it is assumed that a condition for suppressing the branch control is established at time T+6. At time T+6, an ALC route guidance execution request is not established, and the ALC route guidance enters an off state.

Regarding other processing, first, processing from time T+4 to time T+5 will be described. At time T+4, when preparation for start of the lane change is started, a notification indicating that the preparations have been made is sent and the direction indicator is turned on. In this case, a notification sound is output, an image obtained by further emphasizing the image showing that the branch control, which has been displayed at the time of the deceleration approach in the first area, is executed is displayed, and an image for prompting a left lane to be confirmed and an image showing that lane change is performed are displayed in the second area. In the third area, an image including information indicating a movement to the left together with a surroundings situation of the host vehicle M is displayed.

At time T+4, or at a timing between time T+3 and time T+5, a notification for requesting hands-on is sent. At time T+4 to time T+5, the steering drive enters a controlled state for lane change, and the vehicle speed is controlled to a speed according to vehicle speed adjustment. At time T+5, steering assistance is started in a hands-on state, and the host vehicle M starts lane change while controlling the vehicle speed.

At time T+6, when the specific event has occurred, the ALC route guidance enters an OFF state and the operation of the lane change controller 150 is stopped. Between time T+4 and time T+5, the image displayed in the first area is erased, the message indicating that the lane change is suspended is displayed in the second area, and an image showing a situation of surroundings of the host vehicle M is displayed in the third area. The mode controller 160 turns off the direction indicator, stops the lane keeping control (causes steering to transition to manual driving), and further performs suppression of the acceleration. The vehicle speed is maintained at a vehicle speed when the specific event has occurred (however, control is performed so that the host vehicle M does not approach a preceding vehicle as described above). In this case, the driver operates the steering wheel to control the host vehicle M to cause the host vehicle M to change lanes to the branch lane L2 or to cause the host vehicle M to travel in the traveling lane L1 without changing lanes.

When the host vehicle M reaches the end position E, a message indicating the end of driving assistance is displayed in the second area, a notification sound is output, and the suppression of the acceleration and the stop of lane keeping control are released. The host vehicle M transitions to a state in which the host vehicle M is controlled by manual driving. The speed and steering of the host vehicle M are not controlled in the vehicle system 1 but controlled by the driver. When the host vehicle M travels in the traveling lane L1 and reaches the end position E, one or both of the lane keeping control and the ACC speed control may be automatically executed.

Thus, in a case in which the specific event has occurred after the steering assistance, the driving assistance device 100 can stop the lane keeping control so that the operation of the driver is not hindered, and perform the suppression of the acceleration to stabilize the state of the host vehicle M. For example, when the lane keeping control continues, the lane keeping control may hinder the control based on the steering operation of the driver, but since the lane keeping control is stopped as described above, it is possible to prevent the operation of the driver from being hindered.

Figure 11:
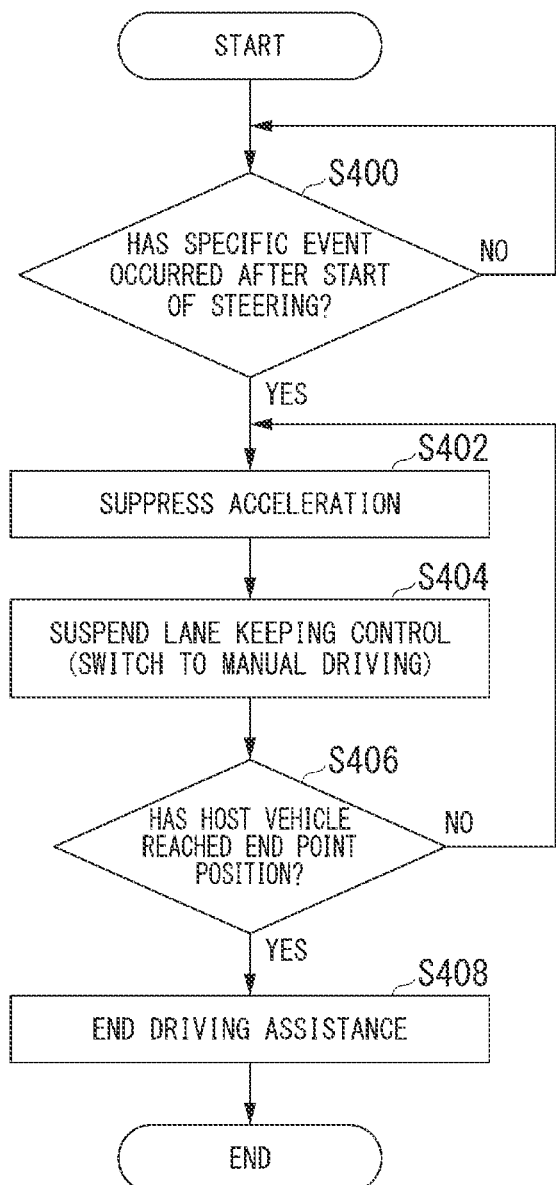
FIG. 11 is a flowchart showing an example of a flow of processing that is executed by the driving assistance device in a case in which the specific event has occurred.

FIG. 11 is a flowchart showing an example of a flow of processing that is executed by the driving assistance device 100 in a case in which the specific event has occurred.

First, the mode controller 160 determines whether or not the specific event has occurred after the start of lane change (step S400). When the specific event has occurred after the start of the lane change, the mode controller 160 suppresses the acceleration (step S402) and stops the hands-off lane keeping control (step S404). After stopping, the host vehicle M is controlled according to the operation of the steering wheel by the driver.

Next, the mode controller 160 determines whether or not the host vehicle M has reached the end point position (step S406). When the host vehicle M has not reached the end point position, the processing returns to step S402. When the end point position has reached the end point position, the mode controller 160 ends the driving assistance (step S408). This causes the transition to manual driving.

As described above, the driving assistance device 100 starts causing the host vehicle M to change the lane from the traveling lane L1 to the branch lane L2 on the basis of the lane change control, and then, stops the lane keeping control and the lane change control when an event in which the branch control cannot be executed has occurred, making it possible to realize control that does not hinder the operation of the driver. For example, control for causing the host vehicle M to travel in the traveling lane L1 through the lane keeping control is prevented from being performed though the driver is performing an operation to change lanes to the branch lane L2.

The embodiment described above can be expressed as follows.

A control device includes
a storage device having a program stored therein, and
a hardware processor, and
wherein the hardware processor executes the program stored in the storage device to execute:
recognizing a situation of surroundings of a host vehicle;
automatically controlling at least steering of the host vehicle to perform branch control on the basis of the surroundings situation recognized by the recognizer, the branch control including lane keeping control for causing the host vehicle to travel so that the host vehicle does not deviate from a first lane in which the host vehicle travels, and lane change control for causing the host vehicle to change lanes to a second lane branching from the first lane, and
stopping the lane keeping control and the lane change control when an event in which the controller cannot execute the branch control after starting the lane change of the host vehicle from the first lane to the second lane on the basis of the lane change control, in a case in which the host vehicle plans on traveling from the first lane to the second lane through execution of the lane keeping control and the lane change control.

While forms for carrying out the present invention have been described using the embodiments, the present invention is not limited to these embodiments at all, and various modifications and substitutions can be made without departing from the gist of the present invention.

What is claimed is:
1. A control device comprising:
a storage medium configured to store computer-readable instructions; and
one or more processors connected to the storage medium, wherein the one or more processors execute the computer-readable instructions to:
recognize a situation of surroundings of a host vehicle,
automatically control at least steering of the host vehicle to execute branch control on the basis of the recognized surroundings situation, the branch control including lane keeping control for causing the host vehicle to travel so that the host vehicle does not deviate from a first lane on a main road on which the host vehicle is travelling, and lane change control for causing the host vehicle to change lanes to a second lane on a branch road branching off from the main road, a first number of lanes on the branch road being less than a second number of lanes on the main road, and
stop the lane keeping control and the lane change control when an event occurs in which the branch control is not executable after starting the lane change of the host vehicle from the first lane on the main road to the second lane on the branch road on the basis of the lane change control, in a case in which the host vehicle plans on traveling from the first lane to the second lane through execution of the lane keeping control and the lane change control,
wherein the one or more processors execute the computer-readable instructions to:
decelerate the host vehicle in order to change the lane from the first lane on the main road to the second lane on the branch road when the host vehicle reaches a predetermined distance before a start position at which the host vehicle starts changing lanes, and
control a speed of the host vehicle so that the speed of the host vehicle at the time of occurrence of the event is maintained and control the host vehicle so that the host vehicle does not deviate from the first lane when the event occurs after the deceleration and before start of the lane change control.

2. The control device according to claim 1,
wherein the one or more processors execute the computer-readable instructions to:
turn on a direction indicator of the host vehicle without depending on an operation of a driver and start the lane change control before the host vehicle reaches a start position of the lane change, and
"after starting the lane change" means "after turning on the direction indicator".

3. The control device according to claim 1,
wherein the event is at least one of the following (1), (2) and (3):
(1) the one or more processors are unable to recognize a position of the host vehicle,
(2) the one or more processors are unable to recognize the second lane or a situation of the second lane on the basis of a result of the recognition, and
(3) a degree of congestion in or near the second lane is equal to or higher than a threshold.

4. The control device according to claim 1,
wherein, in the case in which the host vehicle plans on traveling from the first lane to the second lane through execution of the lane keeping control and the lane change control, the one or more processors execute the computer-readable instructions to:
execute the lane keeping control to cause the host vehicle to travel so that the host vehicle does not deviate from the first lane, until the host vehicle reaches a start position of the lane change, start the lane change control to cause the host vehicle to change lanes from the first lane to the second lane when the host vehicle reaches the start position, and stop the lane change control and execute the lane keeping control to cause the host vehicle to travel so that the host vehicle does not deviate from the second lane, after the lane change.

5. The control device according to claim 4, wherein the one or more processors execute the computer-readable instructions to:

cause the host vehicle to start the lane change, and then, stop the lane keeping control and the lane change control when an event in which the branch control cannot be executed occurs, and resume the lane keeping control when a preset condition is satisfied.

6. The control device according to claim 5, wherein the preset condition is at least one of the following (A), (B) and (C):

(A) the host vehicle has reached a set position,
(B) the host vehicle has traveled a predetermined distance in the second lane, and
(C) the host vehicle has traveled for a predetermined time in the second lane.

7. The control device according to claim 6, wherein the one or more processors execute the computer-readable instructions to:

resume the lane keeping control when the condition (A) is not satisfied and the condition (B) or (C) is satisfied.

8. The control device according to claim 1, wherein the one or more processors execute the computer-readable instructions to:

stop the lane keeping control and the lane change control when an event in which the one or more processors cannot execute the branch control occurs and control a speed of the host vehicle so that the speed of the host vehicle at the time of occurrence of the event is maintained.

9. The control device according to claim 1, wherein the lane keeping control is executable in a state in which the driver of the host vehicle is not gripping a steering wheel of the host vehicle, and the lane change control is executable on the condition that the driver is gripping the steering wheel.

10. The control device according to claim 9, wherein the one or more processors execute the computer-readable instructions to:

control the host vehicle so that the host vehicle does not deviate from the first lane based on the lane keeping control in a case in which the driver is not gripping the steering wheel when the host vehicle reaches a start position of the lane change.

11. The control device according to claim 1, wherein the one or more processors execute the computer-readable instructions to:

stop the lane keeping control and the lane change control when the host vehicle reaches a branch position between the main road and the branch road.

12. A control method, wherein a control device executes:
recognizing a situation of surroundings of a host vehicle;
automatically controlling at least steering of the host vehicle to perform branch control on the basis of the recognized surroundings situation, the branch control including lane keeping control for causing the host vehicle to travel so that the host vehicle does not deviate from a first lane on a main road on which the host vehicle is travelling, and lane change control for causing the host vehicle to change lanes to a second lane on a branching road branching off from the main road, a first number of lanes on the branch road being less than a second number of lanes on the main road, and stopping the lane keeping control and the lane change control when an event occurs in which the branch control is not executable after starting the lane change of the host vehicle from the first lane on the main road to the second lane on the branch road on the basis of the lane change control, in a case in which the host vehicle plans on traveling from the first lane to the second lane through execution of the lane keeping control and the lane change control, wherein the control device executes:
decelerating the host vehicle in order to change the lane from the first lane on the main road to the second lane on the branch road when the host vehicle reaches a predetermined distance before a start position at which the host vehicle starts changing lanes, and controlling a speed of the host vehicle so that the speed of the host vehicle at the time of occurrence of the event is maintained and controlling the host vehicle so that the host vehicle does not deviate from the first lane when the event occurs after the deceleration and before start of the lane change control.

13. A non-transitory computer storage medium having a program stored therein, the program causing a control device to execute:

recognizing a situation of surroundings of a host vehicle;
automatically controlling at least steering of the host vehicle to perform branch control on the basis of the recognized surroundings situation, the branch control including lane keeping control for causing the host vehicle to travel so that the host vehicle does not deviate from a first lane on a main road on which the host vehicle is traveling, and lane change control for causing the host vehicle to change lanes to a second lane on a branch road branching off from the main road, a first number of lanes on the branch road being less than a second number of lanes on the main road, and stopping the lane keeping control and the lane change control when an event occurs in which the branch control is not executable after starting the lane change of the host vehicle from the first lane on the main road to the second lane on the branch road on the basis of the lane change control, in a case in which the host vehicle plans on traveling from the first lane to the second lane through execution of the lane keeping control and the lane change control, wherein the program causing a control device to execute:
decelerating the host vehicle in order to change the lane from the first lane on the main road to the second lane on the branch road when the host vehicle reaches a predetermined distance before a start position at which the host vehicle starts changing lanes, and controlling a speed of the host vehicle so that the speed of the host vehicle at the time of occurrence of the event is maintained and controlling the host vehicle so that the host vehicle does not deviate from the first lane when the event occurs after the deceleration and before start of the lane change control.

\* \* \* \* \*